May 28, 1935. R. P. DIVNEY 2,002,851
EXTENSION AXLE UNIT FOR TRUCKS
Filed April 2, 1934 2 Sheets-Sheet 1
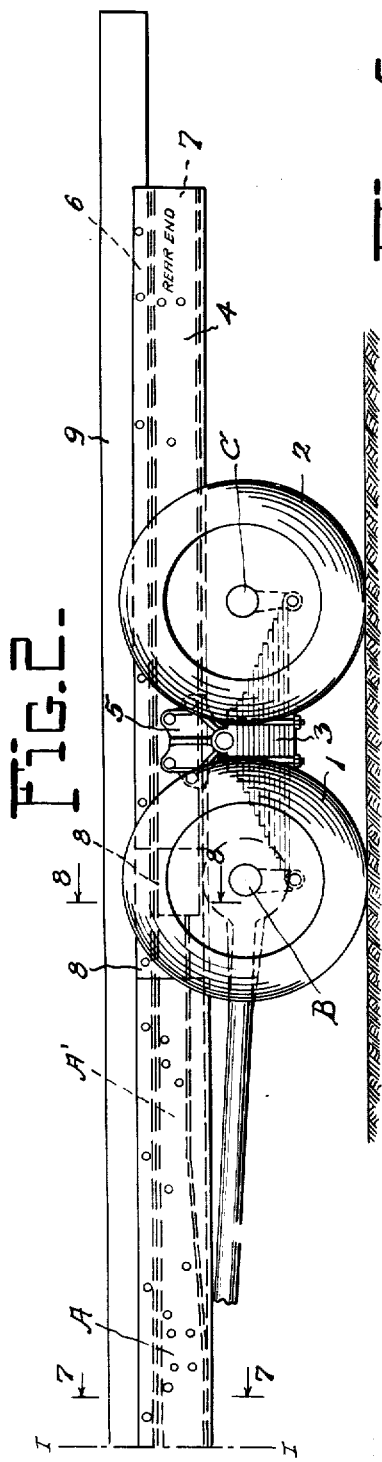
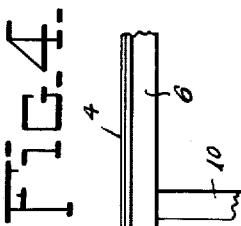
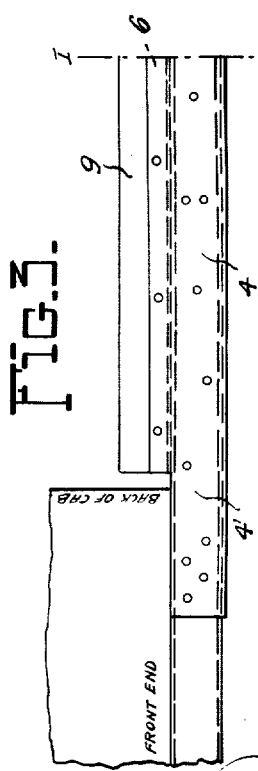
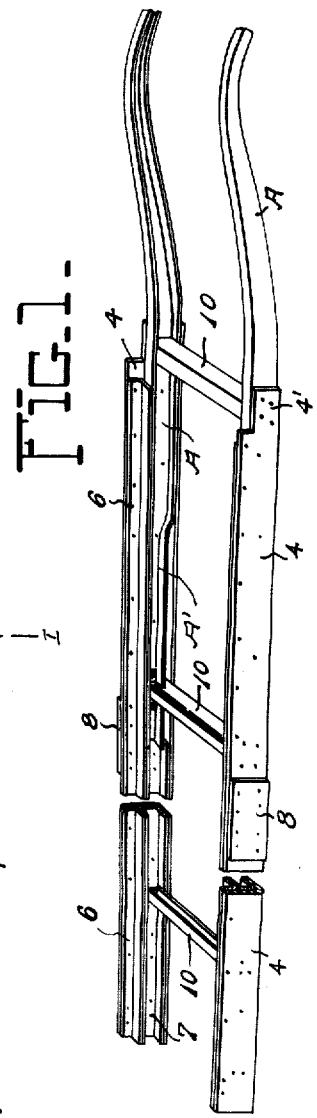
Inventor
RAYMOND P. DIVNEY.
By Robert Roth
Attorneys May 28, 1935. R. P. DIVNEY 2,002,851
EXTENSION AXLE UNIT FOR TRUCKS
Filed April 2, 1934 2 Sheets-Sheet 2
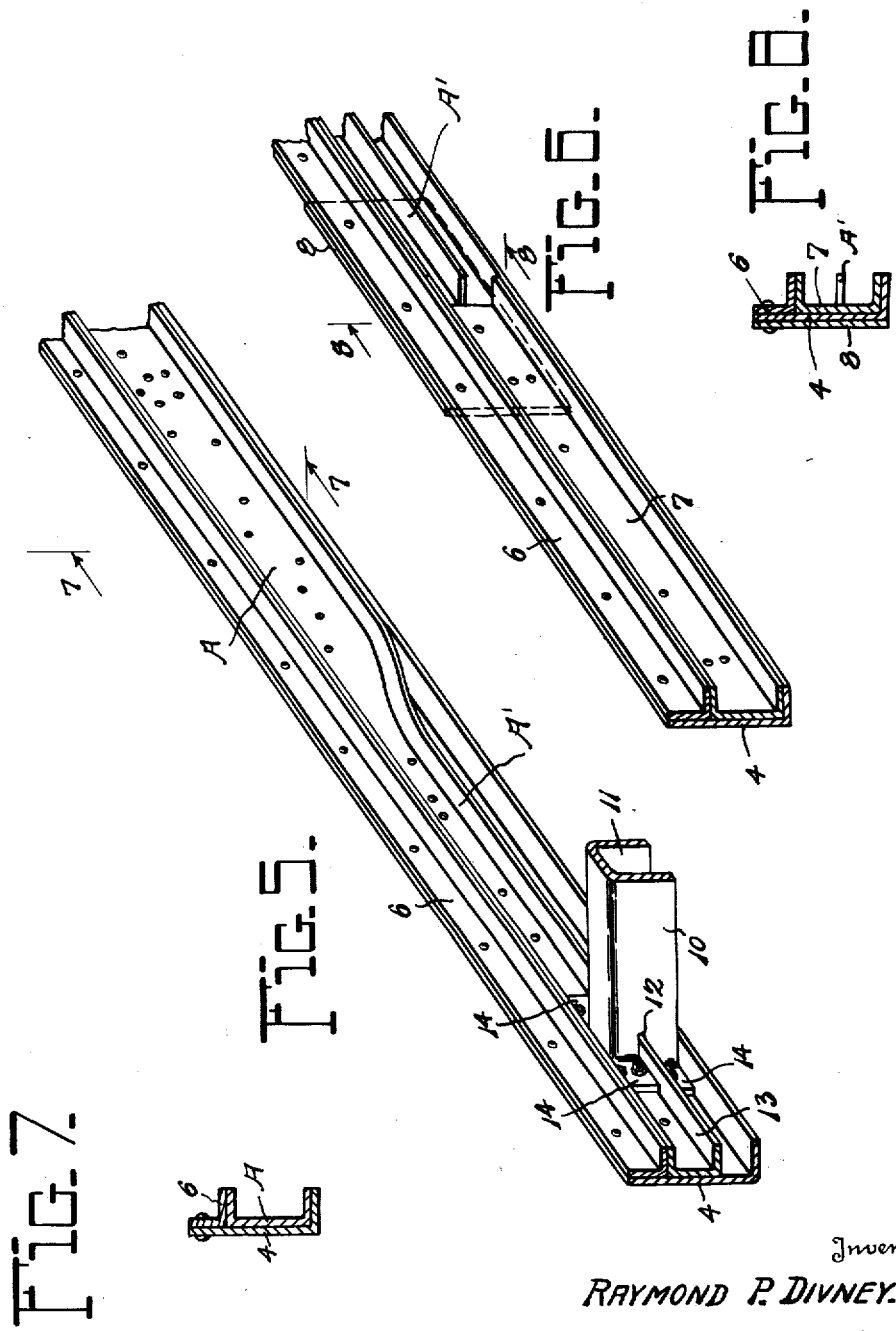
Inventor
RAYMOND P. DIVNEY.
By Robb+Robb
Attorneys Patented May 28, 1935

2,002,851

UNITED STATES PATENT OFFICE 2,002,851

EXTENSION AXLE UNIT FOR TRUCKS

Raymond P. Divney, Galion, Ohio, assignor to The Perfection Steel Body Company, Galion, Ohio, a corporation Application April 2, 1934, Serial No. 718,720

5 Claims. (Cl. 280—106)

The present invention involves certain improvements in what are known in the art of automotive vehicles as six-wheel units for such vehicles. Units of the above kind are ordinarily designed for the purpose of converting so-called four-wheel trucks into six-wheel trucks. Such converted vehicles have heretofore taken two forms, one in which a four-wheel or two-axle unit is mounted on the original truck frame or chassis to increase materially the pay-load capacity of the truck, the pay-load weight being distributed under such conditions over a six-wheel base, so to speak, in lieu of the original four-wheel base. Another form of these known types of six-wheel units contemplates the provision of an extension frame or chassis structure whereby the length of the original chassis is increased, thus permitting the rear pay-load supporting or four-wheel double axle unit to be mounted a greater distance behind the front wheels than permissible in the first type of construction above referred to. In this second type wherein a separate extension frame or chassis is united to the original chassis, the double axle unit carrying the wheels that support the pay-load is usually mounted with attachment to both the original chassis and the extension frame or chassis applied thereto.

My present improvements are designed primarily with a view to obtaining a much increased wheel base than secured with reference to the types of prior art construction above set forth, and having this in view I provide an extension frame mounted in a peculiarly novel manner upon the original chassis or frame of the truck, by the use of which extension frame the rear double axle or pay-load carrying unit may be disposed so that it is attached or carried by the extension frame alone, said extension frame being mounted in a special balanced manner in reference to the double axle unit feature so as to afford effective and proper distribution of the pay-load to be carried by the truck. In the elongation of the chassis according to a construction embodying the present invention, some difficult problems of proper bracing and reinforcement of the frame structures of both the original truck and the extension frame or chassis are involved and the improvements hereinafter set forth are designed with the special objects of achieving a completely safe original chassis and extension chassis assembly ensuring the proper distribution of the pay-load weight and obviating liability of bending or breakage of the original chassis incident to placing the increased loads upon the completed six-wheel unit truck, which loads, of course, are intended to be carried, as compared with the original load capacity of the original truck, according to the designed purpose of the six-wheel unit type of construction.

In the carrying out of the invention, more specifically speaking, there has been designed a special form of substantial chassis or frame mounted for alignment with and attachment to the original truck chassis and braced in relation to the truck chassis in a peculiar manner for the resistance of the breakage and bending stresses and strains which the construction must sustain in actual use. The attachment means is such as to effectively reinforce the combination chassis structures both laterally and vertically, and additionally against relative longitudinal stresses, all of which will appear more fully as the description proceeds.

Referring to the accompanying drawings in which the various parts of the figures are designated by similar reference characters—

Figure 1 is a perspective view showing the manner of assemblage of the original truck chassis or frame with respect to the extension chassis or frame and the attachment members associated for effectively connecting these parts together.

Figure 2 is a side view showing the rear or auxiliary double axle and wheel unit which is primarily carried by or mounted upon the extension frame, the latter permitting of a rearward disposition of the rear double axle and wheel unit, materially increasing the wheel base of the converted truck as compared with the possibilities of accomplishing this result in previous known types of construction.

Figure 3 is a detail side view showing more clearly the manner of disposing the front end portion of the extension frame in conjunction with the adjacent portion of the main truck chassis.

Figure 4 is a top plan view showing more clearly the method of uniting certain parts of the main and auxiliary chassis members or frames.

Figure 5 is a perspective view bringing out more fully the manner in which the rear ends of the main side frame members of the truck are mounted on the side frame members of the extension frame with the mode of reinforcement of the two to hold the same against vertical bending and breakage stresses.

Figure 6 is a view somewhat similar to Figure 5, showing more fully the assembly of the parts at a point farther to the rear than illustrated in Figure 5, and bringing out clearly the mounting of the U-channel and reinforcement plate, the former to reinforce the union of the side frame members of the main and auxiliary or extension chassis parts against longitudinal relative movement.

Figure 7 is a sectional view taken approximately on the line 7—7 of Figure 5.

Figure 8 is a vertical cross sectional view taken approximately on the line 8—8 of Figure 6.

Referring now to Figure 2 of the drawings particularly, the rear portion of the original or main truck chassis or frame is illustrated at A and it is notable that toward the rear end thereof the side channel members making up said frame or chassis are curved and of decreased depth or vertical dimension as shown at A'. Double or two-axle unit is shown as comprising the front axle B, the rear axle C, and the front and rear wheels 1 and 2 respectively, the said axle parts B and C being mounted upon springs 3 and the springs being attached to the side frame members 4 of the extension frame or chassis by brackets 5 or other suitable means, the specific construction of which does not form a part of the present improvements.

It is notable, however, that according to the construction of the present main truck and extension frames, the double axle or wheel unit just referred to is wholly mounted upon the extension chassis or frame including the side frame members 4 aforesaid, and it will be obvious therefore that according to such an arrangement, assuming that the extension chassis is effectively and substantially applied to the main truck chassis, it is possible for the rear double axle unit designed to primarily carry the pay-load to be mounted much farther in rear of the front wheels of the truck, not shown, than heretofore obtained in known types of extension wheel units of the nature of this invention. The rear end portions A' of the side frame members of the main chassis A are attached to the side frame members 4 of the extension chassis by suitable fastenings such as bolts or rivets, and in order to properly reinforce the attachment it is contemplated to employ special angle plates 6 that are disposed above the rear end portion A' of the main side member of the truck frame, these angle plates 6 being intended to amply reinforce the connection between the parts A and 4 against vertical bending and breakage stresses. It is contemplated to carry the front ends of the side frame members 4 sufficiently forward along the side frame members of the main chassis frame A so that the front ends of the members 4 will extend beyond the vertical line of the rear of the cab of the truck, as shown at 4' in Figure 3, so as to avoid liability of bending and breakage of the side frame members of the main chassis A at this point, which in practice is found to be the weakest portion of the main truck frame as used today, bearing in mind the factor of distribution of the pay-load or weight supported on the truck under operating conditions.

To provide a stop or reinforcement in abutment with the rear ends A' of the side frame members of the main chassis A to reinforce the connection of these parts with the members 4 against relative longitudinal movement or stresses, it is contemplated to apply to the inner sides of the members 4 the channel members 7 which are securely fastened by rivets or bolts between the rearmost portions of the angle plates 6 and the lower flanges of the members 4, all as seen most clearly in Figures 1, 6, and 8 of the drawings. As additional means to reinforce the connection of the parts that have been above set forth, it is notable upon reference to Figures 2, 4, and 8 especially, that a reinforcement plate 8 is applied to the members 4 at the outer side portions thereof and bolted or riveted through the members A', 6 and 7, especially to reinforce the connection of these parts at the points adjacent the rear extremities of the side frame members A.

The disposition and form of the angle plates 6 is not only conducive to the use of these plates to afford special reinforcements in the manner above set forth, but when the pay-load body is mounted upon the main chassis parts A and the extension chassis parts 4, the spaced sills 9 which form parts of such body may be seated upon the lateral or horizontal flanges of the angle plates 6. In this manner the weight of the truck body is carried on the main and extension chassis side frame members so that the said weight assists in maintaining the various parts, such as the angle plates on the bars 6, U-channels 7, and side frame members 4 and A, in reinforced attached relation.

By reason of the special, substantial connections that are provided according to the features of construction above described, intermediate the side members of the original or main chassis of the truck and the side members 4 of the extension chassis or frame, it is apparent that notwithstanding the mounting of the double axle and wheel unit upon the extension chassis, the union or connection between the two chassis frames is so designed that no weakening of the ultimate or final construction is created as an incident to the increased elongation of the wheel base by the facility with which the double axle or wheel unit may be positioned much farther to the rear of the front wheels than heretofore obtainable in other constructions. It is contemplated to use suitable reinforcing cross members 10 intermediate the frame members 4 and the side frame members of the main chassis A, such members being commonly employed in constructions of this type.

One of the cross members 10 indicated by the numeral 11 may be provided with a slot 12 somewhat larger than the flange 13 of member A' to permit the installation of this cross member in such a manner that its flanges 14 may be secured to the main truck chassis A and also to the side frame members 4, as clearly shown in Figure 5. The arrangement of the cross member 11 in the above mentioned manner increases very considerably the stability of the entire frame structure.

Having thus described my invention, what I claim as new and desire to secure by Letters Patent of the United States, is—

1. In automobile truck constructions of the type described, in combination, a main truck chassis embodying spaced side frame members, an extension unit for said main truck chassis likewise embodying spaced side frame members in substantial alignment with the corresponding members of the main truck chassis and projecting a considerable distance alongside of the latter side frame members, fastening means between the side frame members of the main truck chassis and the extension unit, reinforcing parts intermediate the said side frame members bracing the corresponding side frame members of the chassis and extension unit against vertical stresses, and against relative longitudinal movement and a double axle and wheel unit wholly mounted upon the extension unit aforesaid.

2. In automobile truck constructions of the type described, in combination, a main truck chassis embodying spaced side frame members, an extension unit for said main truck chassis likewise embodying spaced side frame members in substantial alignment with the corresponding members of the main truck chassis and projecting a considerable distance alongside of the latter side frame members, fastening means between the side frame members of the main truck chassis and the extension unit, the side frame members of the main truck chassis being of less vertical depth than the side frame members of the extension unit, angle bars secured to the sides of the side frame members of the extension unit and disposed in abutting overlapping relation to the side frame members of the main truck chassis, together with fastening means between the said angle bars and the said side frame members of the extension unit, and a rear axle and wheel unit associated with said main truck chassis and extension unit.

3. In automobile truck constructions of the type described, in combination, a main truck chassis embodying spaced side frame members, an extension unit for said main truck chassis likewise embodying spaced side frame members in substantial alignment with the corresponding members of the main truck chassis and projecting a considerable distance alongside of the latter side frame members, fastening means between the side frame members of the main truck chassis and the extension unit, the side frame members of the main truck chassis being of less vertical depth than the side frame members of the extension unit, angle bars secured to the sides of the side frame members of the extension unit and disposed in abutting overlapping relation to the side frame members of the main truck chassis, fastening means between the said angle bars and the said side frame members of the extension unit, and a rear axle and wheel unit associated with said main truck chassis and extension unit, the side frame members of the extension unit embodying offsetting flanges at their lower edges, reinforcing members for abutting cooperation with the rear ends of the side frame members of the main truck chassis and comprising channel members secured to the side frame members of the extension unit intermediate the said angle bars and the lower flanges of said side frame members of the extension unit.

4. In automobile truck construction of the type described, in combination, a main truck chassis comprising spaced side frame members, an extension unit frame or chassis associated with said main truck chassis and comprising side frame members extending a considerable distance in rear of the rear extremities of the frame members of the main truck chassis and projecting forwardly for a considerable distance alongside the side frame members of the main truck chassis, said side frame members of the extension unit comprising inwardly projecting flanges at their lower edges, and the side frame members of the main truck chassis being of less vertical dimension than the side frame members of the extension unit, angle bars mounted on the side frame members of the extension unit and projecting over the side frame members of the main truck chassis in abutment therewith, channel members received between the rear end portions of said angle bars and the flanges of the side frame members of the extension unit and having their front ends abutting with the rear ends of the side frame members of the main truck chassis, fastenings attaching the side frame members of the main truck chassis to the similar members of the extension unit and attaching the angle bars and channel members to the said side frame members of the extension unit, a reinforcement plate fastened to the outer sides of the side frame members of the extension unit and extending forwardly some distance alongside the rear ends of the side frame members of the main truck chassis and extending rearwardly some distance alongside the front ends of the channel members applied to the side frame members of the extension unit, the fastenings securing said reinforcement plates to the side frame members of the extension unit also attaching them to the rear ends of the side frame members of the main truck chassis, the front ends of the side frame members of the extension unit and the angle bars and channel members associated with said parts, a rear axle and wheel unit mounted solely upon the extension unit aforesaid, and a truck frame comprising spaced sills supported on the horizontal flanges of the angle bars disposed above the rear portions of the side members of the main truck chassis and also the channel members on the extension unit.

5. In automobile truck constructions of the type described, in combination, a main truck chassis embodying spaced side frame members, an extension unit for said main truck chassis likewise embodying spaced side frame members in substantial alignment with the corresponding members of the main truck chassis and projecting a considerable distance alongside of the latter side frame members beyond the point in rear of the cab where the maximum bending stresses on said latter side frame members are received, fastening means between the side frame members of the main truck chassis and the extension unit, reinforcing parts intermediate the said side frame members bracing the same against vertical and longitudinal stresses and including members secured to the side frame members of the extension unit and projecting in overlapping relation to the side frame members of the main truck chassis and disposed in abutting relation to the end of the side frame members of the main truck chassis, and a rear axle and wheel unit wholly mounted upon the extension unit aforesaid.

RAYMOND P. DIVNEY.